USO10438582B1

US 10,438,582 B1

(12) United States Patent
VanLund et al.

(10) Patent No.: US 10,438,582 B1
(45) Date of Patent: Oct. 8, 2019

(54) ASSOCIATING IDENTIFIERS WITH AUDIO SIGNALS

(71) Applicant: Amazon Technologies, Inc., Seattle, WA (US)

(72) Inventors: Peter Spalding VanLund, Seattle, WA (US); Nicolas Anton Medhurst Hertl, Seattle, WA (US); Peter Paul Henri Carbon, Bellevue, WA (US); Frederic Johan Georges Deramat, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 453 days.

(21) Appl. No.: 14/573,943

(22) Filed: Dec. 17, 2014

(51) Int. Cl.
 G10L 17/22 (2013.01)
 G10L 15/18 (2013.01)
(52) U.S. Cl.
 CPC .............. *G10L 15/18* (2013.01); *G10L 17/22* (2013.01)
(58) Field of Classification Search
 CPC ..................................................... G10L 15/22
 USPC ........................................................ 704/257
 See application file for complete search history.

(56) References Cited

U.S. PATENT DOCUMENTS

| 6,434,520 | B1* | 8/2002 | Kanevsky | G06F 17/30746 |
| | | | | 704/243 |
| 6,600,874 | B1* | 7/2003 | Fujita | G11B 20/10 |
| | | | | 386/249 |
| 7,103,157 | B2* | 9/2006 | Celi, Jr. | H04L 49/90 |
| | | | | 370/352 |
| 7,630,986 | B1* | 12/2009 | Herz | G06Q 10/10 |
| 7,720,683 | B1* | 5/2010 | Vermeulen | G10L 15/22 |
| | | | | 704/235 |
| 2001/0047262 | A1* | 11/2001 | Kurganov | H04M 3/4938 |
| | | | | 704/270.1 |
| 2004/0044516 | A1* | 3/2004 | Kennewick | G10L 15/22 |
| | | | | 704/5 |
| 2004/0215462 | A1* | 10/2004 | Sienel | G10L 13/047 |
| | | | | 704/260 |
| 2005/0038660 | A1* | 2/2005 | Black | G06F 3/167 |
| | | | | 704/275 |
| 2009/0112602 | A1* | 4/2009 | Alfred | H04L 12/2818 |
| | | | | 704/273 |
| 2011/0264452 | A1* | 10/2011 | Venkataramu | G10L 15/22 |
| | | | | 704/260 |
| 2014/0071342 | A1* | 3/2014 | Winograd | H04N 5/44 |
| | | | | 348/383 |

(Continued)

*Primary Examiner* — Daniel C Washburn
*Assistant Examiner* — Timothy Nguyen
(74) *Attorney, Agent, or Firm* — Lee & Hayes, P.C.

(57) ABSTRACT

A voice-controlled device may receive a voice command uttered by a user, where the voice command may request that the voice-controlled device perform an operation. The voice-controlled device and/or one or more remote computing resources may process an audio signal associated with the voice command to determine text corresponding to the voice command. The resulting user utterance may be associated with a unique identifier, which may be provided to a third party and/or third party application that is to provide information responsive to the user request. The information provided by the third party/third party application may be output to the user based at least partly on the unique identifier, without disclosing user data associated with the user.

20 Claims, 5 Drawing Sheets

(56) References Cited

U.S. PATENT DOCUMENTS

| | | | |
|---|---|---|---|
| 2014/0074481 A1* | 3/2014 | Newman | G10L 25/51 704/275 |
| 2014/0075465 A1* | 3/2014 | Petrovic | H04N 21/252 725/14 |
| 2014/0278443 A1* | 9/2014 | Gunn | G06F 3/0488 704/275 |
| 2016/0055859 A1* | 2/2016 | Finlow-Bates | G10L 21/0202 704/225 |
| 2016/0261917 A1* | 9/2016 | Trollope | G10L 25/51 |

* cited by examiner

ASSOCIATING IDENTIFIERS WITH AUDIO SIGNALS

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
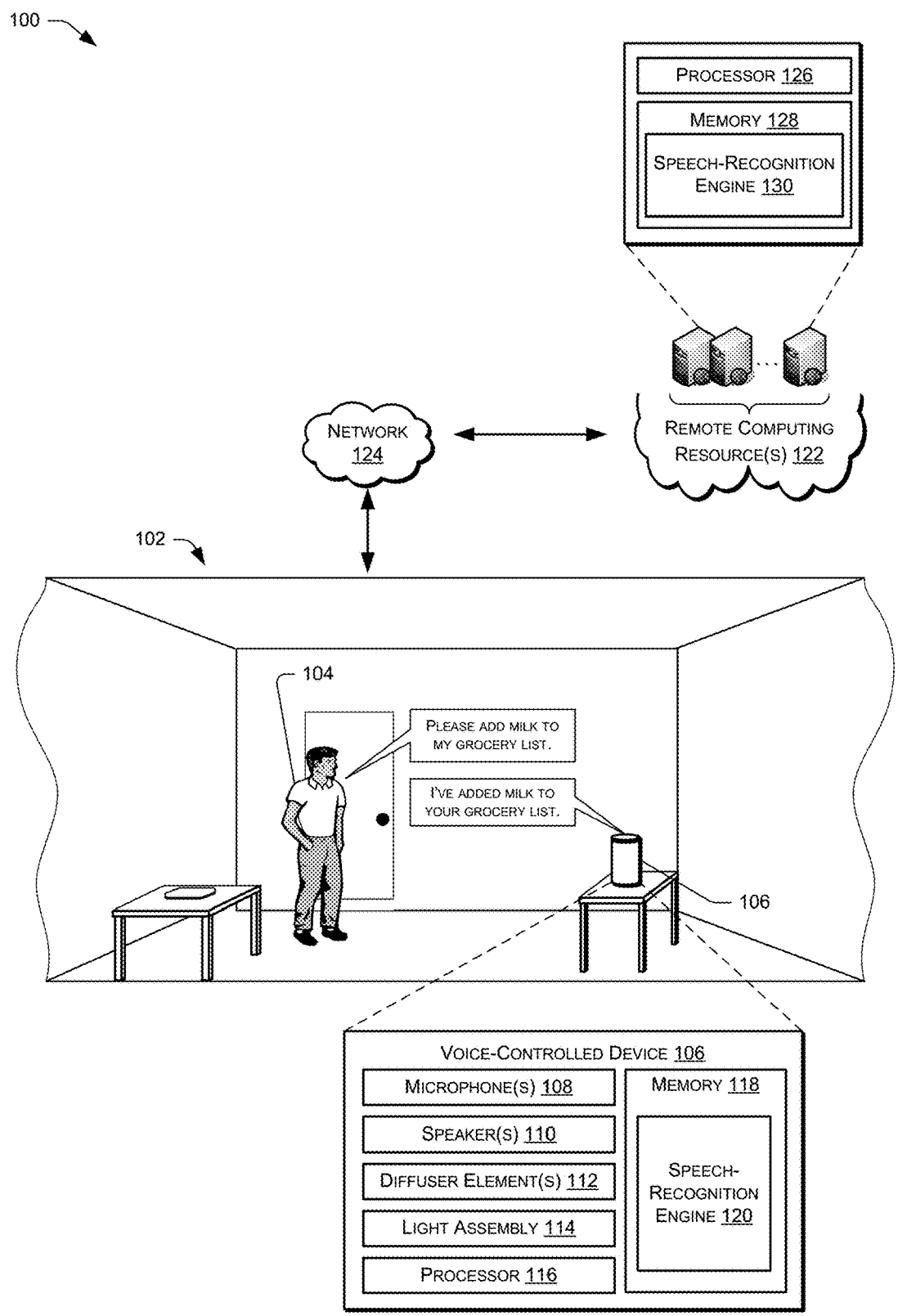
FIG. 1 shows an illustrative voice interaction computing architecture set in a home environment. The architecture includes a voice-controlled device physically situated in the home and communicatively coupled to remote computing resources. The voice-controlled device includes a microphone to receive voice commands, a light ring to provide visual cues to a user issuing the commands, and speakers for outputting audio to the user.

This disclosure describes systems and/or processes for maintaining the security and confidentiality of audio data captured by one or more devices, such as a voice-controlled devices. In some instances, the voice-controlled devices may include one or more microphones for detecting audio, such as audible commands uttered by users. After capturing and processing an audio command, the voice-controlled devices may output an audible response via one or more speakers, where the audible response is responsive to the audio command. The voice-controlled devices may access or utilize one or more resources (e.g., a remote computing device, a third party, a third party application, etc.) in order to output the audible response. Information responsive to the audible command may also be presented via an application associated with a user device of the user.

The audio captured by the microphone(s) of the voice-controlled device may include audio different from the audible commands of the user, such as background noise (e.g., appliances, etc.), words or phrases of the user that are different from the audible commands, and/or the voices of other users within the environment in which the voice-controlled device is situated. As a result, the audio signals generated from the captured audio may include confidential or sensitive information that was not intended to be captured by the voice-controlled device. The voice-controlled device, or an entity associated with the voice-controlled device, may desire to prevent such information from being disclosed to other entities, such as third party applications that reside on, or are otherwise associated with, the voice-controlled device.

In certain embodiments, an audible command of the user may relate to, or request information from, an application of the voice-controlled device that is hosted by a third party (also referred to as "third party application"). In order to provide information responsive to the audible command, the third party and/or the third party application may need access to audio data and/or the text that corresponds to the audible command. Instead of providing the audio data/text to the third party, however, the systems and processes described herein may associate a unique identifier with the audio data/text. The unique identifier may then be provided to the third party. When the voice-controlled device is to audibly output information responsive to the audible command, the third party may provide the responsive information with the appropriate unique identifier to the voice-controlled device. The voice-controlled device may then audibly output the responsive information with the audio data/text that is associated with that unique identifier.

As a result, relevant information may be output to the user via a third party application, while the actual audio data or the corresponding text is maintained by the voice-controlled device. That is, the raw audio data in the form of an audio signal, a processed audio signal, corresponding text, etc., may be persisted by the voice-controlled device (and/or remote computing resource). Rather than providing such information to third parties or third party applications, the system may instead provide the third parties/third party applications with a mechanism to reference this data by an associated unique identifier. Accordingly, any confidential or sensitive data of the user may not be revealed.

The devices and techniques introduced above may be implemented in a variety of different architectures and contexts. One or more non-limiting and illustrative implementations are described below.

FIG. 1 shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room of the home environment 102. In other implementations, it may be placed or mounted in any number of locations (e.g., ceiling, wall, in a lamp, beneath a table, under a chair, etc.). Further, more than one voice-controlled device 106 may be positioned in a single room, or one voice-controlled device 106 may be used to accommodate user interactions from more than one room.

Generally, the voice-controlled device 106 has a microphone unit comprising at least one microphone 108 and a speaker unit comprising at least one speaker 110 to facilitate audio interactions with the user 104 and/or other users. The voice-controlled device 106 may also include one or more diffuser elements for diffusing sound from the speaker about the voice-controlled device 106. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output.

The voice-controlled device may further include a light assembly 114. The light assembly 114 may comprise a light ring atop the voice-controlled device 106 for providing visual feedback to the user 104. One example implementation of the voice-controlled device 106 is provided below in more detail with reference to FIG. 5.

The microphone 108 of the voice-controlled device 106 detects audio from the environment 102, such as sounds uttered from the user 104. As illustrated, the voice-controlled device 106 includes a processor 116 and memory 118, which stores or otherwise has access to a speech-recognition engine 120. As used herein, a processor may include multiple processors and/or a processor having multiple cores. The speech-recognition engine 120 performs speech recognition on audio signals generated based on sound captured by the microphone 108, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the voice-controlled device 106 (e.g., "I'd like to go to a movie. Please tell me what's playing at the local cinema.").

The memory 118 of the voice-controlled device 106 may include one or more additional modules, engines, or components. For instance, the memory 118 may include a module that associates identifiers (e.g., a unique identifiers) with audio signals generated from the sound captured by the microphone 108. A particular identifier may uniquely identify the audio signal associated therewith and may be stored by the voice-controlled device 106 and/or the remote computing resource(s) 122. Provided that the audio signal includes a request for information that is to be provided by a third party (e.g., a third party application), the identifier associated with that audio signal may be provided to the third party. When the third party provides information responsive to the request, which may include the audio signal itself (or text associated with the audio signal), the third party may reference that audio signal by providing the previously received identifier. As a result, the voice-controlled device 106 need not provide the audio signal third parties.

In some instances, the voice-controlled device 106 may operate in conjunction with or may otherwise utilize computing resource(s) 122 that are remote from the environment 102. For instance, the voice-controlled device 106 may couple to the remote computing resource(s) 122 over a network 124. As illustrated, the remote computing resource(s) 122 may be implemented as one or more servers and may, in some instances, form a portion of a network-accessible computing platform implemented as a computing infrastructure of processors, storage, software, data access, and so forth that is maintained and accessible via a network such as the Internet. The remote computing resource(s) 122 do not require end-user knowledge of the physical location and configuration of the system that delivers the services. Common expressions associated for these remote computing resources 122 include "on-demand computing", "software as a service (SaaS)", "platform computing", "network-accessible platform", "cloud services", "data centers", and so forth.

The remote computing resource(s) 122 may include one or more processors 126 and memory 128. As illustrated, the memory 128 may store and utilize a speech-processing engine 130 for receiving audio signals from the device 106, recognizing speech and, potentially, causing performance of an action in response. For instance, the engine 130 may identify speech within an audio signal by performing natural language understanding (NLU) techniques on the audio signal. In addition, the engine 130 may provide audio for output on a client device (e.g., the voice-controlled device 106) via text-to-speech (TTS). In some examples, the voice-controlled device 106 may upload audio data to the remote computing resources 122 for processing, given that the remote computing resources 122 may have a computational capacity that far exceeds the computational capacity of the voice-controlled device 106. Therefore, the voice-controlled device 106 may utilize the speech-processing engine 130 for performing relatively complex analysis on audio captured from the environment 102.

Regardless of whether the speech recognition occurs locally or remotely from the environment 102, the voice-controlled device 106 may receive vocal input from the user 104 and the voice-controlled device 106 and/or the remote computing resources 122 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth. In some instances, the voice-controlled device 106 also interacts with a client application stored on one or more client devices of the user 104.

The voice-controlled device 106 may communicatively couple to the network 124 via wired technologies (e.g., wires, USB, fiber optic cable, etc.), wireless technologies (e.g., WiFi, RF, cellular, satellite, Bluetooth, etc.), or other connection technologies. The network 124 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies.

Figure 2:
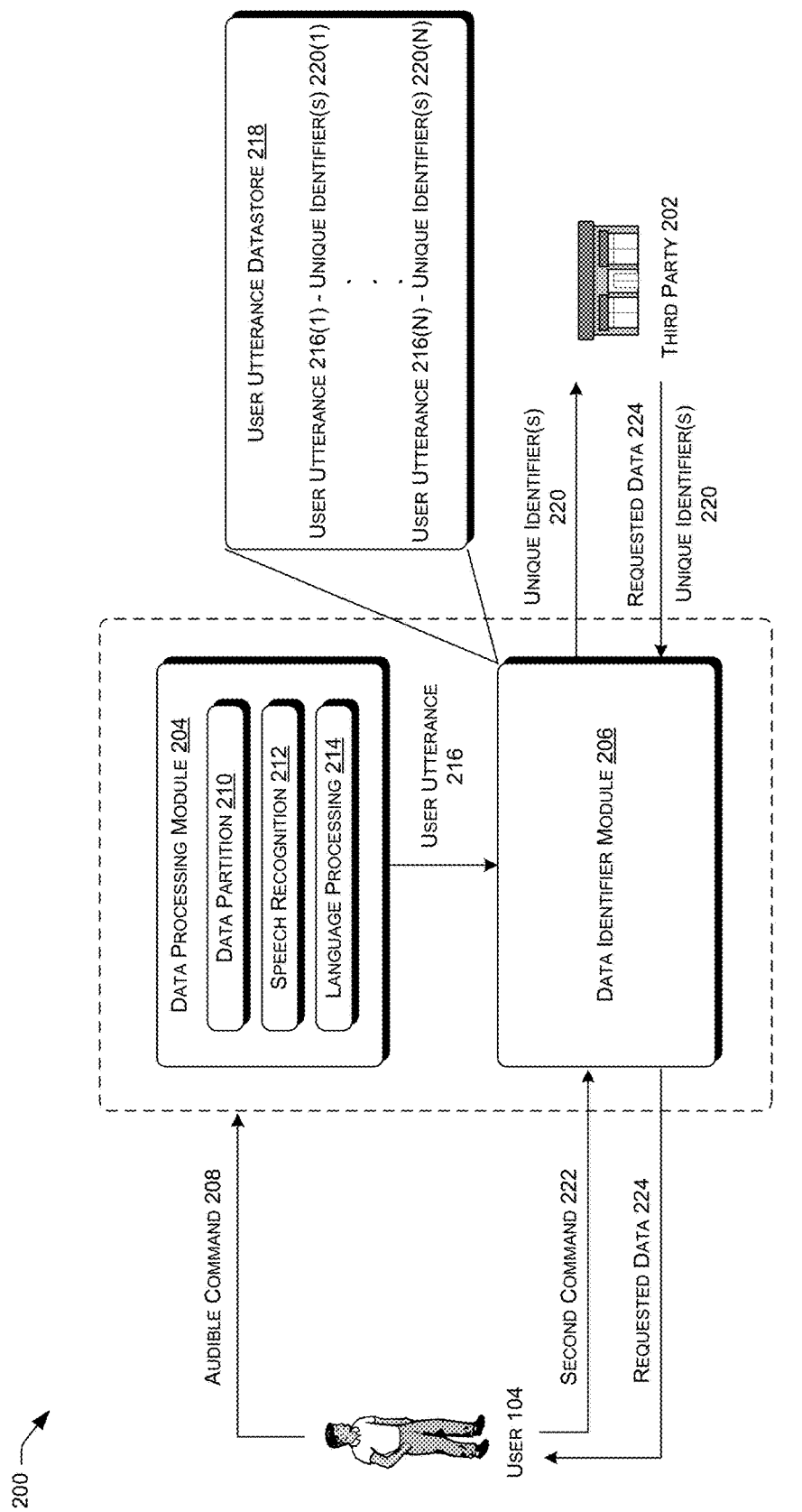
FIG. 2 shows an illustrative system for outputting information to a user based at least partly on unique identifiers associated with audio and/or text.

FIG. 2 illustrates a system for receiving audible commands from a user and outputting information responsive to the audible commands. When outputting the information to the user, the system 200 may maintain the confidentiality of user data, which may include the audible commands and other sound captured by the microphone(s) of the voice-controlled device, which may be represented by one or more audio signals. In particular, provided that a third party (e.g., a third party application) assists in generating/providing the information output to the user, the system 200 may associate a unique identifier with the audio signal(s) corresponding to the audible commands and then provide that unique identifier to the third party/third party application. The unique identifier may be referenced by the third party/third party application when referring to the audible signal and/or the information to be provided to the user, which prevents the third party from having access to the potentially confidential user data.

As shown, the system 200 may include a user 104, the voice-controlled device 106, and a third party 202. Moreover, the voice-controlled device 206 may include any number of components, engines, and/or modules, which may include a data processing module 204 and a data identifier module 206. For the purpose of FIG. 2, any actions or processes performed by the voice-controlled device 106 may instead be performed by the remote computing resource(s) 122, as shown in FIG. 1, or by a combination of the voice-controlled device 106 and the remote computing resource(s) 122.

Initially, the user 104 may make an audible command 208 that is directed towards the voice-controlled device 106. The audible command 208 may include any words or phrases and may request that the voice-controlled device 106 perform an action. For instance, the audible command 208 may be a request that the voice-controlled device activate or wake up. Provided that the voice-controlled device 106 is already active and prepared to capture sound (e.g., the audible command 208 uttered by the user 104) within the environment, the audible command 208 may include a request that the voice-controlled device 106 perform a particular action. For instance, the request may relate to the weather in a particular region, the recording of a voice memo, or playing a game via the voice-controlled device 106.

The one or more microphone(s) 108 of the voice-controlled device 106 are configured to capture sound/audio within the environment in which the voice-controlled device 106 is situated. As a result, the microphone(s) 108 of the voice-controlled device 106 may capture the audible command 208 when uttered by the user 104. The microphone(s) 108 may also capture sound other than the audible command 208, such as background noise (e.g., an appliance), a conversation between individuals, and/or possibly confidential or sensitive information that the user 104 or other users did not intend the voice-controlled device 106 to capture. From the raw audio signal generated from the captured audio, the voice-controlled device 106 may be unable to identify the audible command 208 and other sound captured by the microphone(s) 108 of the voice-controlled device 106. That is, the voice-controlled device 106 may be unable to determine what the user 104 is requesting from the voice-controlled device 106. To determine the content of the audible command 208, the data processing module 204 of the voice-controlled device 106 may process the audio signal generated from the raw, unprocessed audio. In various embodiments, the audio signal may be representative of the sound captured by the microphone(s) 108 of the voice-controlled device 106.

Prior to performing speech recognition and/or NLU on the audio signal, the data processing module 204 may partition the audio data (i.e., data partition 210) into one or more audio segments. The data partition 210 may be performed with respect to the audio signal for the purpose of identifying the particular audible command 208 uttered by the user 104. In some embodiments, the data partition 210 of the audio signal may be based on the actual sound captured within the environment. The data processing module 204 may segment or partition the audio signal by identifying a start point and an end point within the audio signal generated from the captured audio. For instance, the start point may correspond to a time in which the microphone(s) 108 of the voice-controlled device first detect a particular sound, such as when the user 104 begins uttering the audible command 208. The end point of the audio segment may correspond to a predetermined amount of time after the sound is no longer detected by the microphone(s) 108. That is, the data processing module 210 may identify an end point a predetermined amount of time after the user 104 finishes speaking. As a result, the audible command 208 may be included within the audio segment that extends from the start point to the end point within the audio signal. To partition the audio signal, the data processing module 204 may maintain the segments of the audio signal that include audio uttered by the user 104, which may correspond to the audio signal beginning at the start point and concluding at the end point. The data processing module 204 may optionally delete or disregard the portions of the audio signal that do not include any sound, or do not include sound associated with the user 104. Additional audio segments of the audio signal may be partitioned to capture additional utterances made by the user 104.

In some embodiments, once the audio signal is partitioned, the data processing module 204 may perform speech recognition 212 and/or natural language processing 214 on the partitioned audio segments of the audio signal. For the purpose of this discussion, speech recognition 212 may correspond to the process of translating spoken words into text, and may also be referred to as automatic speech recognition (ASR), computer speech recognition, or speech to text (STT). In some embodiments, the process of translating the spoken words into text may be performed by an ASR service or by software, residing on the voice-controlled device 106 and/or the remote computing resource(s) 122, that performs the ASR. The data processing module 204 may use speaker-independent speech recognition, where the speech recognition 212 is performed on the audio signal without considering the speaker that uttered the audible command 208. In other embodiments, the speech recognition 212 may be speaker dependent, meaning that the speech recognition may be performed based on the particular user 104 that uttered the audible command 208. In some embodiments, speaker dependent speech recognition 212 may be based on models trained from previous speech of the user 104. As a result of the speech recognition 212, the data processing module 204 may determine one or more words or phrases from the audio signal that was generated by the microphone(s) 108 of the voice-controlled device 106. That is, the speech of the user 104 (i.e., the audible command 208) may be translated into text.

Although the data processing module 204 may determine the text corresponding to the audio signal using speech recognition 212, it may be difficult to determine the meaning of the text and/or the intent of the user 104. That is, the words included in the audible command 208 may be known, but it may be unclear as to what the user 104 is requesting from the voice-controlled device 106. As a result, the data processing module 204 may also perform language processing 214 on this text in order to determine the meaning or intent of the audible command 208. In certain embodiments, natural language understanding (NLU) processes may be utilized to parse the text to identify the user's 104 intent with respect to the text of the audible command 208. In certain embodiments, the NLU processes may be performed by a natural language processing service or by software, residing on the voice-controlled device 106 and/or the remote computing resource(s) 122, that performs the natural language processing.

In order to determine the intent or meaning of the text, the data processing module 204 may analyze the words or phrases included in the determined text. In particular, the data processing module 204 may compare the words or phrases to a catalog or list of known entities for the purpose of determining the user's 104 intent in uttering that word/phrase. For instance, assume that the determined text of the audible command 208 is "what is the weather in Seattle?" The data processing module 204 may compare the word "Seattle" to a list of known cities to determine that the user 104 is referring to the city of Seattle, Wash. The city of Seattle may then be referred to as a resolved entity. On the other hand, if the text of the audible command 208 was determined to be "what is the weather in Disneyland?", the data processing module 204 may be unable to identify a city that corresponds to "Disneyland." As a result, since this term does not appear in the catalog or list of known cities, the term "Disneyland" may be referred to as an unresolved entity.

Accordingly, the data processing module 204 may convert the audio signal generated from the raw audio into text and then produce a semantic representation of the text, which may indicate the intent of the user 208 in uttering the audible command 208. That is, the data processing module 204 may determine the most likely meaning(s) of the audible command 208 uttered by the user 104. In various embodiments, the data partition 210, the speech recognition 212, and/or the language processing 214 may be performed by the voice-controlled device 106, the remote computing resource(s) 122, or a combination of the voice-controlled device 106 and the remote computing resource(s) 122.

After processing the audio signal generated from the audio captured by the microphone(s) 108 of the voice-controlled device 106, the data processing module 204 may output one or more user utterances 216. A user utterance 216 may be representative of the processed audio signal, which may include one or more words or phrases spoken by the user 104. That is, the user utterance 216 may correspond to audio data after the speech recognition 212 and/or the language processing 214 has been performed on the audio signal. As a result, the user utterance 216 may include the voice of the user 104. In other embodiments, the user utterance 216 may correspond to the text of the audible command 208 after the speech recognition 212 and/or the language processing 214 has been performed on the audio signal. That is, the user utterance 216 may include the text of the words spoken by the user 104.

In some embodiments, the voice-controlled device 106 may include, or be associated with, one or more applications, some of which may be hosted by a third party. The applications may include, or at least have access to, various types of data that can be provided to the user 104. For instance, the voice-controlled device 106 may include applications relating to weather, the creation of voice memos, playing games, purchasing items (e.g., goods, services, etc.), and so on. In the case of applications hosted by third parties (i.e., third party applications), in order to provide responsive information to the user 104, the third party and/or the third party application may need to know the particular information that is being requested. However, since the audio signal and/or the associated text may include user information that is confidential or sensitive in nature, the system described herein may be reluctant to provide that type of data to third parties.

Accordingly, the data identifier module 206 may associate identifiers (i.e., unique identifiers 220) with the user utterances 216 determined by the data processing module 204. That is, the data identifier module 206 may associate a unique identifier 220 with each of the audible commands 208, represented by the audio signal(s), and/or the text associated therewith. As a result, each user utterance 216 (e.g., audio, text, etc.) may be referenced by its corresponding unique identifier 220. The systems and/or processes described herein may persist the associations between the user utterances 216 and the unique identifiers 220, such as by storing the associations in a user utterance datastore 218 that is maintained by the voice-controlled device 106 and/or the remote computing resource(s) 122. In certain embodiments, the user utterance datastore 218 may be a database that includes the user utterances (e.g., user utterances 216(1)-216(N)) and the unique identifiers (unique identifiers 220(1)-220(N)) that are associated with each of the user utterances 216(1)-216(N). For the purpose of this discussion, the unique identifiers 220 may be generated and/or associated with the user utterances 216 by the voice-controlled device 106, the remote computing resource(s) 122, or a combination of the two.

The unique identifiers 220 may include any combination of numbers letters, symbols, and/or other characters that uniquely identify each of the user utterances 216. The unique identifiers 220 may be randomly generated or may otherwise be created by the voice-controlled device 106 and/or the remote computing resource(s) 122. The unique identifiers 220 may also include some combination of characters that indicate what the corresponding user utterances 216 relate to. For instance, if it is determined that a particular user utterance 216 requests information from a third party/third party application, its associated unique identifier 220 may include a combination of characters that identifies that third party, or that indicates the type of information being requested. Moreover, as described below, the unique identifier 220 for a particular user utterance 216 may be provided by a third party 202, such as the third party/third party application that is to provide information requested by the user 104.

In some embodiments, the audible command 208 uttered by the user 104 may request that the voice-controlled device 106 activate or wake up, or may request that the voice-controlled device 106 and/or the remote computing resource(s) 122 provide various information (e.g., the weather, the price of an item, to perform an operation, etc.). However, in other embodiments, the audible command 208 uttered by the user 104 may request information that is to be provided by a third party 202, such as a third party application hosted by, or otherwise associated with, the third party 202. Such information may include information related to a game, a voice memo, or any other information that the voice-controlled device 106 and/or the remote computing resource(s) 122 may be unable to provide.

In response to determining that the user utterance(s) 216 associated with the audible command 208 requests information from a third party 202 or a third party application, instead of providing the user utterance(s) 216 (e.g., the audio, the audio signal, text associated with the audio signal, etc.) to the third party 202, the data identifier module 106 may instead provide the unique identifier(s) 220 associated with the user utterance(s) 216 to the third party 202. That is, the third party 202 may receive an identifier or token that references or corresponds to the user utterance(s) 216. In some embodiments, in response to receiving the unique identifier(s) 220, the third party 202 may provide information responsive to the audible command 208 to the voice-controlled device 106. If the information provided by the third party 202 includes, or references, the user utterance 216, the third party 202 may reference the unique identifier 216 corresponding to that user utterance 216 when providing the information.

As a result, the third party 202/third party application may incorporate the user utterance 216 in the information it provides by referencing the unique identifier 220 that corresponds to that user utterance 216. The voice-controlled device 106 or the third party application may then output the responsive information to the user 104 without the user utterance 216 being provided to the third party 202. In some embodiments, the responsive information may be audibly output to the user 104. For instance, the responsive information may include a recording of one or more words previously uttered by the user 104 and captured by the microphone(s) 108 of the voice-controlled device 106. The responsive information that is audibly output may also include a text-to-speech representation of the words associated with the user utterance 216, where the audible representation may or may not be the voice of the user 104 that initially uttered the audible command 208.

In other embodiments, the voice-controlled device 106 and/or the remote computing resource(s) 122 may provide one or more unique identifiers 220 to the third party 202, and the voice-controlled device 106 may optionally receive an additional command (i.e., second command 222) from the user 104. The second command 222 may relate to, or request the same or similar information as, the initial audible command 208 uttered by the user 104. Provided that the second command 222 requests information associated with the first audible command 208, the voice-controlled device 106 (or the remote computing resource(s) 122) may identify the user utterance(s) 216 corresponding to the audible command 208 and the unique identifier(s) 220 associated therewith. Based on that particular unique identifier 220, the third party application may cause the voice-controlled device 106 to output information responsive to the audible command 222, which may be referred to requested data 224.

The requested data 224 may be presented to the user 104 without the user 104 providing the second command 222. For instance, the third party application may receive a request to provide information and, as a result, the third party application may provide the responsive data 224. The voice-controlled device 106 and/or the remote computing resource(s) 122 may cause the responsive data 224 to be output to the user 104.

In some embodiments, the second command 222 may be an audible command uttered by the user 104. That is, the second command 222 may include one or more words that are uttered by the user 104 and that are captured by the microphone(s) 108 of the voice-controlled device 106. In other embodiments, the second command 222 may be provided by the user 104 via a user interface or a graphical user interface associated with the voice-controlled device 106 or associated with a user device associated with the user 104. For instance, the user 104 may interact with an application that resides on the user device or that is accessible via the user device. The application may be associated with the voice-controlled device 106 and/or the remote computing resource(s) 122.

Regardless of whether the second command 222 is provided by the user 104, the requested data 224 may be presented to the user 104. In some embodiments, the requested data 224 may be audibly output to the user 104 via the speaker(s) 110(*s*) of the voice-controlled device 106. For instance, the requested data 224 may include one or more words previously uttered by the user 104, or may include a text-to-speech representation of the text associated with the audible command 208. The requested data 224, when audibly output by the voice-controlled device 106, may also include other information that is responsive to a request provided by the user 104.

In other embodiments, the requested data 224 may be output to the user 104 in a different manner. In particular, based at least partly on the audible command 208 and/or the second command 222, the requested data 224 may be visually output via a user device associated with the user 104. For instance, the user device may include, or at least have access to, an application that is associated with the voice-controlled device 106 and/or the remote computing resource(s) 122. The application may visually present the requested data 224 via a graphical user interface. The application may also be used to interact with the voice-controlled device 104 and/or the remote computing resource(s) 122, such as by the user 104 utilizing the application to provide the second command 222, to control the operation of the voice-controlled device 106, to view the status of previously provided requests made to the voice-controlled device 106, to set or adjust settings of the voice-controlled device 106, and so on. Moreover, the application may display information associated with the user's 104 interactions with the voice-controlled device 106. For instance, if the user 104 requested the current weather from the voice-controlled device 106, the application may display the current weather (e.g., the temperature, icons representing the current weather, etc.).

As stated above, the data processing module 204 may partition the audio signal generated from sound captured by the microphone(s) 108 of the voice-controlled device 106 into multiple segments or partitions. The raw audio signal may be partitioned by determining the beginning and end of various sounds within the raw audio signal, which may correspond to a command audibly output by the user 104. For instance, a particular audio segment of the audio signal may begin when the user 104 begins speaking, and may conclude when the user 104 does not speak for a predetermined amount of time. Since the user 104 may not speak continuously, may pause between words, and/or may stop speaking and then continue speaking once again, the audio signal may be partitioned into multiple audio segments, some of which may be related to one another. That is, if the audible command 208 consisted of the user 104 speaking a few words, pausing for an amount of time that exceeds the predetermined amount of time, and then speaking additional words, the audible command 208 included within the audio signal may be partitioned into at least two audio segments. However, since the two audio segments relate to a single audible command 208 or multiple related audio commands 208, the multiple audio segments may be associated with each other.

Therefore, the voice-controlled device 106 and/or the remote computing resource(s) 122 may associate different but related user utterances 216, which each have respective unique identifiers 220. In certain embodiments, the unique identifiers 220 may be associated with one another. The user utterance datastore 218 may store or persist the associations between related user utterances 216/unique identifiers 220. That is, unique identifiers 220 that are determined to be related to one another may be stored in the user utterance datastore 218 in association with one another. The related/associated unique identifiers 220 may be linked in the user utterance datastore 218 or may be stored in the same, or a similar, location within the user utterance datastore 218. As a result, when it is determined that a third party 202 or a third party application is to provide information based on a request from the user 104, the voice-controlled device 106 and/or the remote computing resource(s) 122 may be able to identify which user utterances 216 and corresponding unique identifiers 220 are needed to provide such information. In some embodiments, multiple related and associated unique identifiers 220 and corresponding user utterances 216 may be needed to provide information responsive to the audible command 208 uttered by the user 104.

As an illustrative example, assume that the voice-controlled device 106 includes, or is associated with, an application (i.e., a third party application) that is hosted by the third party 202. Further assume that the third party application creates voice memos for the user 104, such that the user 104 may utilize the voice-controlled device 106 to record audible messages that can be played back via the speaker(s) 110 of the voice-controlled device 106 at a later time. In this example, the user 104 may initially request that the voice-controlled device 106 record a voice memo (e.g., "I need to go to the grocery store"). In response, the third party application may cause the microphone(s) 108 of the voice-controlled device 106 to prompt the user 104 to audibly state the desired voice memo.

Upon capturing the audio of the user 104 that is intended to be the voice memo, the data processing module 204 may perform data partition 210, speech recognition 212, and/or language processing 214 on the audio signal generated from the captured audio. The processed audio signal may be referred to as a user utterance 216, and as a result of the processing, the meaning or intent of the user utterance 216 (i.e., the voice memo) may be determined. The voice-controlled device 106 and/or the remote computing resource(s) 122 may associate a unique identifier 220 with that user utterance 216, which may be stored in the user utterance datastore 218. The unique identifier 220 associated with that voice memo may also be provided to the third party 202 and/or the third party application.

Then, when the user 104 subsequently requests that the voice-controlled device 106 replay the previously recorded voice memo, the voice-controlled device 106 may audibly output the voice memo via the speaker(s) 110. To do so, the third party 202 and/or the third party application may provide the unique identifier 220 that corresponds to that voice memo. The voice-controlled device 106 may then identify the voice memo from the unique identifier 220 and audibly output the requested voice memo to the user 104. As a result, the third party application may cause the voice-controlled device 106 to audibly output the voice memo without the third party 202 and/or the third party application having access to the audio signal that is generated from, and represents, the captured audio. Instead, the third party 202 merely references the requested voice memo by a unique identifier, which prevents potentially confidential or sensitive user data being revealed to the third party 202/third party application.

In other embodiments, the third party application may be associated with a game that can be played by the user 104 via the voice-controlled device 106. For the purpose of this discussion, assume that the game is "mad libs," which is a word game where the user 104 is prompted to provide one or more words to substitute for blanks in a story. The story is then read aloud with the words provided by the user 104. In this example, the user 104 may initially utter a request that he/she would like to play mad libs. As a result, the third party application may cause the voice-controlled device 106 to prompt the user 104 for one or more verbs, nouns, adjectives, etc. The microphone(s) 108 of the voice-controlled device 106 may capture the words uttered by the user 104, and the voice-controlled device 106 and/or the remote computing resource(s) 122 may process the audio signal generated from the captured audio to translate the spoken words into text. One or more unique identifiers 220 may be associated with the spoken words/text, stored in the user utterance datastore 218, and possibly provided to the third party and/or the third party application. That is, the third party/third party application is provided with one or more unique identifiers 220, as opposed to the actual audio or corresponding text. In certain embodiments, the user utterance datastore 218 may include user utterances 216, unique identifiers 220 associated therewith, and the third party application that is to provide information responsive to the user utterances 216.

The user 104 may subsequently request that the voice-controlled device 106 audibly output the story with the words uttered by the user 104. In response to the user request, the third party/third party application may provide the story, which may include the unique identifiers 220 that correspond to the words uttered by the user 104. The unique identifiers 220 may be inserted into the story in locations where the corresponding words should be included. Since the voice-controlled device 106 and/or the remote computing resource(s) 122 have previously associated the words uttered by the user 104 with the unique identifiers 220, the unique identifiers 220 included within the story may be replaced with the appropriate words. The voice-controlled device 106 may then audibly output the story to the user 104, which may include the words uttered by the user 104. In this embodiment, the third party/third party application may not have access to the raw audio, the audio signal(s) generated from the captured audio, and/or the translated text of the words uttered by the user 104. Instead, the third party/third party application may only be aware that words were uttered by the user 104.

Figure 3:
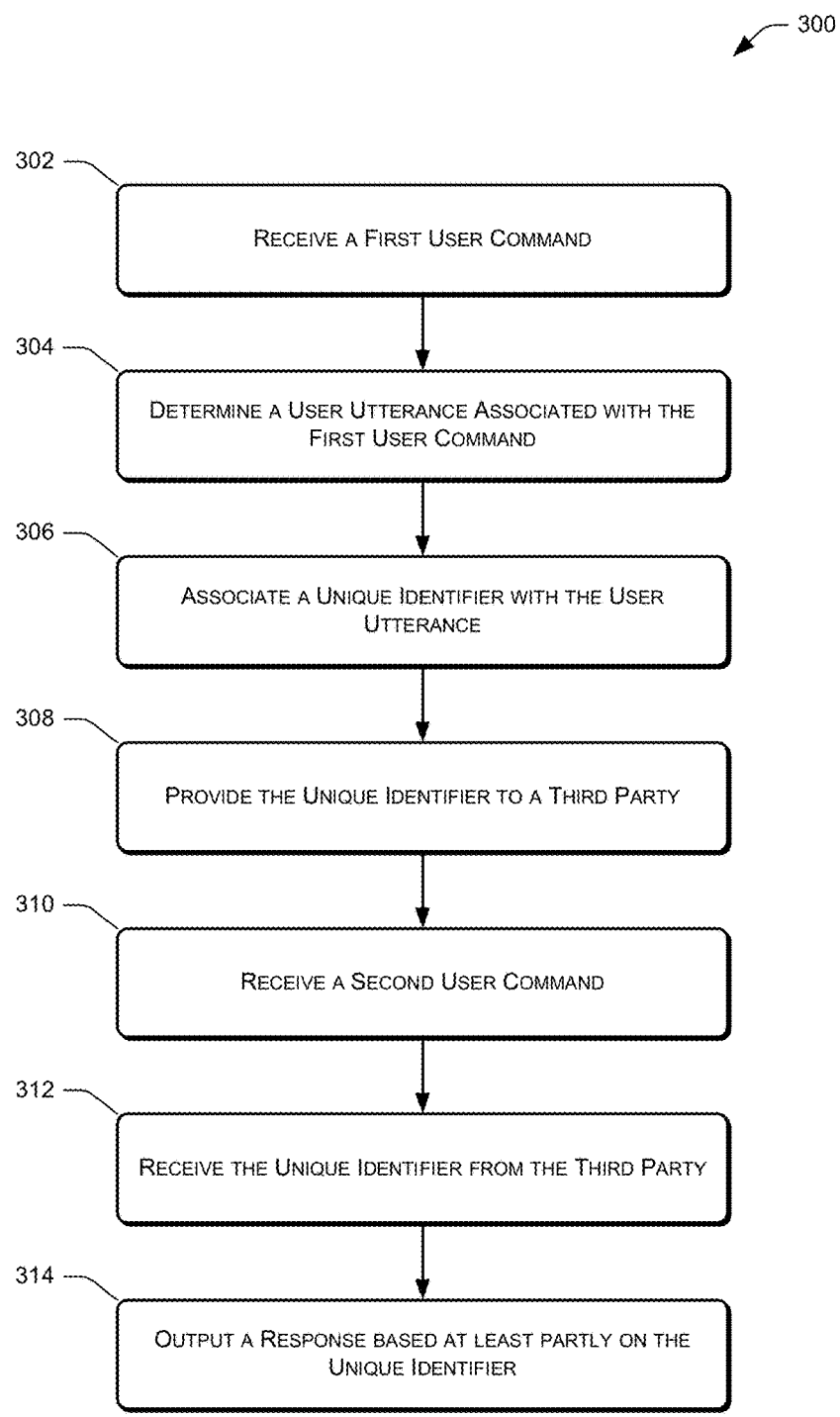
FIG. 3 shows an illustrative flow diagram for outputting information to a user based at least partly on unique identifiers associated with audio.
Figure 4:
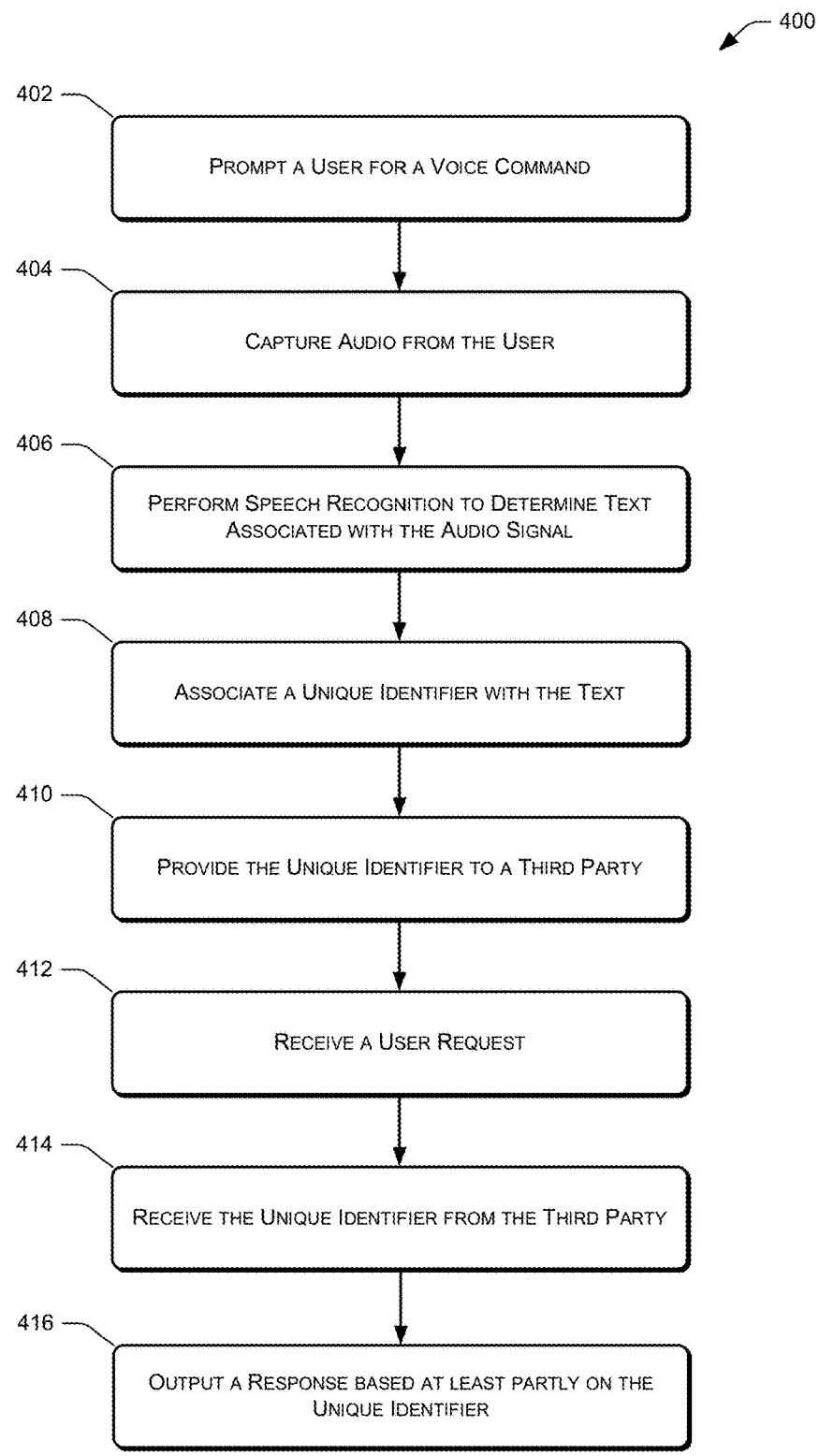
FIG. 4 shows an illustrative flow diagram for outputting information to a user based at least partly on unique identifiers associated with text corresponding to audio data.

FIGS. 3 and 4 are flow diagrams of illustrative processes for audibly outputting information to a user based at least partly on unique identifiers associated with user utterances. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram illustrating an example process 300 of audibly outputting information to a user based on a unique identifier provided to a third party and/or third party application. Moreover, the following actions described with respect to FIG. 3 may be performed by the voice-controlled device 106 and/or the remote computing resource(s) 122, as illustrated in FIGS. 1 and 2.

The process 300 includes, at 302, receiving a first user command. In various embodiments, the first user command (e.g., the audible command 208) uttered by the user 104 may request certain information from the voice-controlled device 106. For example, the first user command may be a request for the voice-controlled device 106 to record a voice memo, play a game, and/or provide other information.

At 304, the process 300 determines a user utterance associated with the first user command. More particularly, the voice-controlled device 106 and/or the remote computing resource(s) 122 may process an audio signal generated from the audio. Processing of the audio signal may include partitioning the audio signal into one or more segments, performing speech recognition 212 (e.g., ASR) on the audio segments of the audio signal in order to identify text corresponding to the first user command, and performing language processing 214 (e.g., NLU) on the audio segments of the audio signal in order to determine the meaning of the text and/or the intent of the user 104 that uttered the first user command. The processed audio signal may result in one or more user utterances 216 that is representative of either audio and/or text.

At 306, the process 300 associates a unique identifier with the user utterance. For instance, for each user utterance 216 resulting from processing the audio signal, an identifier that uniquely identifies the user utterance 216 may be associated with the user utterance 216 and may be stored by the voice-controlled device 106 and/or the remote computing resource(s) 122. In some embodiments, the unique identifier 220 may be any combination of characters that uniquely identifies the user utterance 216 and may be determined by the voice-controlled device 106, the remote computing resource(s) 122, or a third party 202 that is to provide information responsive to the first user command.

At 308, the process 300 provides the unique identifier to a third party. More particularly, provided that the first user command requests information that is to be provided by a third party 202, the unique identifier(s) 220 associated with the corresponding user utterance(s) 216 may be provided to the third party 202 or an application residing on the voice-controlled device 106 or the remote computing resource(s) 122 that is hosted by the third party 202 (i.e., a third party application).

At 310, the process 300 optionally receives a second user command. In some embodiments, the second user command may request that the voice-controlled device 106 audibly output the first user command, or request that the voice-controlled device 106 audibly output information that was requested in the first user command. The information requested by the second user command may be information that is to be provided by the third party 202 and/or the third party application.

At 312, the process 300 receives the unique identifier from the third party. Potentially in response to the second user command, the third party 202 or the third party application may provide information that is being requested by the user 104. With this information, the third party 202 or the third party application may provide the unique identifier 220 that references the user utterance 216 resulting from the first user command. That is, within, or in addition to, the information provided by the third party 202/third party application, the third party 202/third party application may utilize the unique identifier 220 to reference audio and/or text that is being requested by the user 104. Since the third party 202/third party application may reference this audio/text using the unique identifier 220, the voice-controlled device 106 and/or the remote computing resource(s) 122 need not provide any user data to the third party 202/third party application. As a result, the voice-controlled device 106 and/or the remote computing resource(s) 122 may avoid the possibility of disclosing confidential or sensitive information that was inadvertently recorded by the microphone(s) 108 of the voice-controlled device 106.

At 314, the process 300 outputs a response based at least partly on the unique identifier. That is, the voice-controlled device 106 and/or the remote computing resource(s) 122 may cause the information to be audibly output by the third party 202/third party application by replacing the unique identifier(s) 220 with the associated audio and/or text. Alternatively, the response may be visually presented to the user 104 via a user device associated with the user 104. In particular, an application that resides on the user device and that is associated with the voice-controlled device 106 and/or the remote computing resource(s) 122 may cause the response to be displayed via a graphical user interface.

FIG. 4 is a flow diagram illustrating an example process 400 of audibly outputting information to a user based on a unique identifier provided to a third party and/or a third party application. Moreover, the following actions described with respect to FIG. 4 may be performed by the voice-controlled device 106 and/or the remote computing resource(s) 122, as illustrated in FIGS. 1 and 2.

The process 400 includes, at 402, prompting a user for a voice command. In various embodiments, the voice-controlled device 106 may request that the user 104 utter one or more words, where a third party application may cause the voice-controlled device 106 to prompt the user 104 for the voice command. In some embodiments, the prompting of the voice command may be in response to a user request to play a game associated with the third party application.

At 404, the process 400 captures audio from the user. In particular, the user 104 may utter one or more words, which are captured by the microphone(s) 108 of the voice-controlled device 106. An audio signal generated from the captured audio may be partitioned in order to identify audio segments of the audio signal that correspond to words uttered by the user 104.

At 406, the process 400 performs speech recognition to determine text associated with the audio signal. For instance, if it is determined that the user 104 uttered one or more words, the voice-controlled device 106 and/or the remote computing resource(s) 122 may perform ASR techniques to identify text corresponding to the one or more words.

At 408, the process 400 associates a unique identifier with the text. In particular, after identifying the text associated with the words spoken by the user 104, the voice-controlled device 106 and/or the remote computing resource(s) 122 may associate a unique identifier 220 with the text as a whole, or may associate a particular unique identifier 220 with each of the words spoken by the user 104. The determined text and the associated unique identifiers 220 may be stored/persisted by the voice-controlled device 106 and/or the remote computing resource(s) 122, such as in the user utterance datastore 218 illustrated in FIG. 2.

At 410, the process 400 provides the unique identifier to a third party. That is, provided that the third party application is to provide information responsive to a request by the user 104, the voice-controlled device 106 and/or the remote computing resource(s) 122 may provide the appropriate unique identifiers 220 to the third party 202/third party application. The unique identifiers 220 may include those that are needed by the third party 202/third party application to provide relevant information to the user 104. For example, if the third party application allows the user 104 to play a mad libs game with the voice-controlled device 106, the unique identifiers 220 may correspond to the text of the words spoken by the user 104, which may be incorporated into the story that is to be audibly output to the user 104.

At 412, the process 400 receives a user request. In some embodiments, the user request may request that the voice-controlled device 106 audibly output information requested by the user 104, such as a request for the voice-controlled device 106 to output a story that incorporates the words previously uttered by the user 104. In other embodiments, the voice-controlled device 106 may audibly output information previously requested by the user 104 without receiving an additional user request.

At 414, the process 400 receives the unique identifier from the third party. That is, the third party 202/third party application may provide information requested by the user 104, which may include one or more of the unique identifiers 220 previously associated with the determined text. In some embodiments, the unique identifier may otherwise be obtained from the third party 202/third party application. The information provided by the third party 202/third party application may reference the text via the one or more unique identifiers 220. In this embodiment, the third party 202/third party application may not have access to the audio signal, which may represent the audio of the words uttered by the user 104, and/or the text corresponding to the audio signal. As a result, the systems and processes described herein may preserve the confidentiality of potentially sensitive user data that is captured by the microphone(s) 108 of the voice-controlled device 106.

At 416, the process 400 outputs a response based at least party on the unique identifier. For example, provided that the third party 202/third party application provides responsive information with the one or more unique identifiers 220, the voice-controlled device 106 may replace the unique identifier(s) 220 with the corresponding text or audio and then audibly output such information to the user 104. In other embodiments, the response may be presented via a graphical user interface of a user device associated with the user 104. More particularly, an application that resides on the user device and that is associated with the voice-controlled device 106 and/or the remote computing resource(s) 122 may visually present the response to the user 104.

Figure 5:
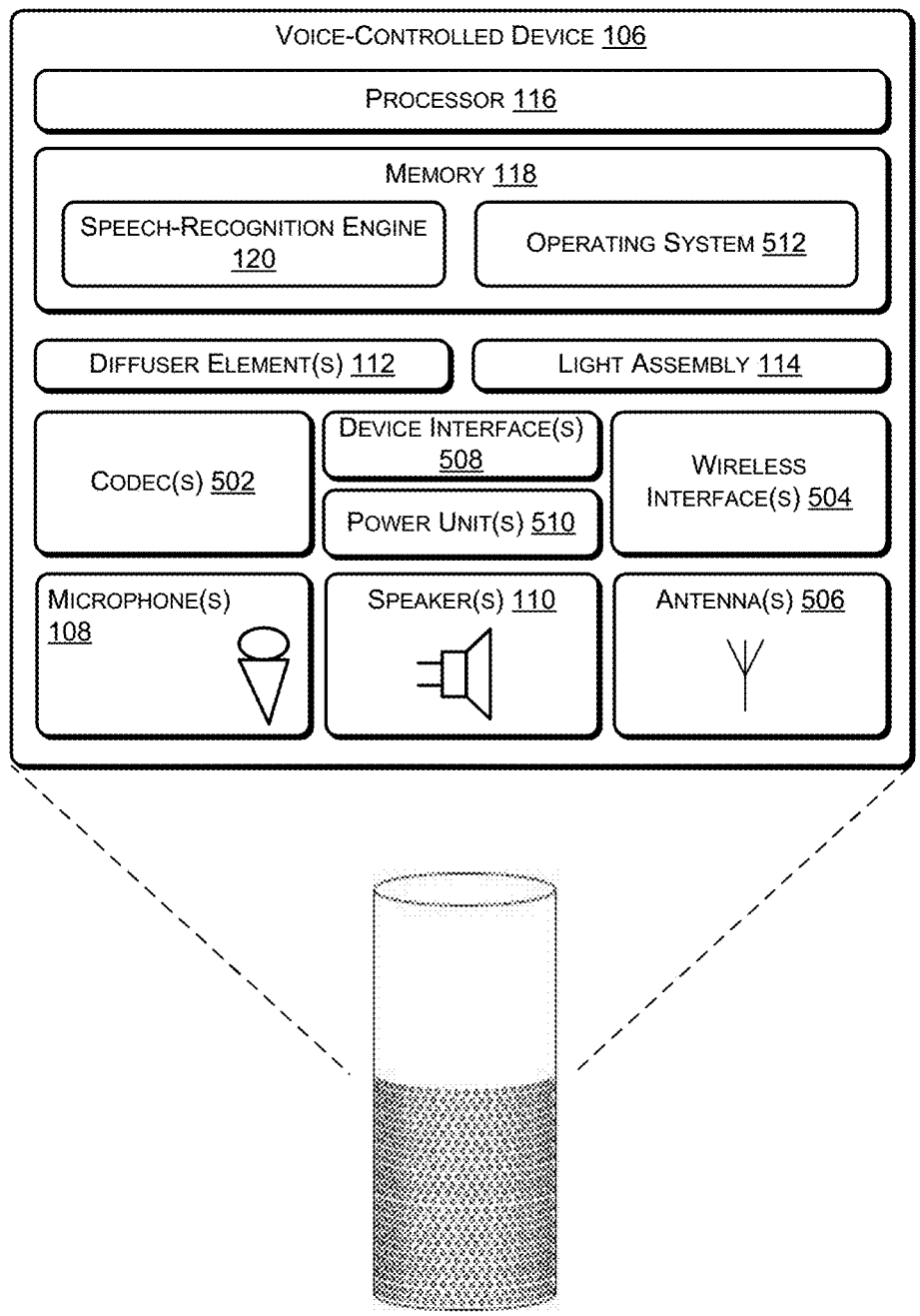
FIG. 5 shows an illustrative block diagram of selected functional components implemented in the voice-controlled device shown in FIG. 1.

FIG. 5 shows selected functional components of one implementation of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the voice-controlled device 106 may be implemented with the ability to receive and output audio, a network interface (wireless or wire-based), power, and limited processing/memory capabilities.

In the illustrated implementation, the voice-controlled device 106 includes the processor 116 and memory 118. The memory 118 may include computer-readable storage media ("CRSM"), which may be any available physical media accessible by the processor 116 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 116.

The voice-controlled device 106 includes a microphone unit that comprises one or more microphones 108 to receive audio input, such as user voice input. The voice-controlled device 106 also includes a speaker unit that includes one or more speakers 110 to output audio sounds. The voice-controlled device 106 also includes the diffuser elements 112 and the light assembly 114, as described above.

One or more codecs 502 are coupled to the microphone(s) 108 and the speaker(s) 110 to encode and/or decode the audio signals. The codec(s) 502 may convert audio data between analog and digital formats. A user may interact with the voice-controlled device 106 by speaking to it, and the microphone(s) 108 captures sound and generates an audio signal that includes the user speech. The codec(s) 502 encodes the user speech and transfers that audio data to other components. The voice-controlled device 106 can communicate back to the user by emitting audible statements through the speaker(s) 110. In this manner, the user interacts with the voice-controlled device 106 simply through speech, without use of a keyboard or display common to other types of devices.

In the illustrated example, the voice-controlled device 106 includes one or more wireless interfaces 504 coupled to one or more antennas 506 to facilitate a wireless connection to a network. The wireless interface(s) 504 may implement one or more of various wireless technologies, such as Wi-Fi, Bluetooth, RF, and so on.

One or more device interfaces 508 (e.g., USB, broadband connection, etc.) may further be provided as part of the voice-controlled device 106 to facilitate a wired connection to a network, or a plug-in network device that communicates with other wireless networks. One or more power units 510 are further provided to distribute power to the various components on the voice-controlled device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple lighting elements (e.g., LEDs around perimeter of a top portion of the device) to indicate a state such as, for example, when power is on or to indicate when a command is received. But, otherwise, the voice-controlled device 106 does not use or need to use any input devices or displays in some instances.

Several modules such as instruction, datastores, and so forth may be stored within the memory 118 and configured to execute on the processor 116. An operating system module 512 is configured to manage hardware and services (e.g., wireless unit, Codec, etc.) within and coupled to the voice-controlled device 106 for the benefit of other modules. In addition, the memory 118 may include the speech-recognition engine 120, as discussed above.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A voice-controlled device comprising:
one or more microphones to:
detect sound within an environment in which the voice-controlled device is physically located; and
generate an audio signal from the sound;
one or more processors;
memory; and
one or more computer-executable instructions stored in the memory and executable by the one or more processors to perform operations comprising:
identifying, using an automated speech recognition service, text associated with the audio signal, the text including one or more words uttered by a user within the environment;
determining, using a natural language processing service, a likely meaning of the one or more words;

determining, based on the likely meaning of the one or more words, that the one or more words are representative of at least a portion of a request for first information to be provided by an entity;

generating an identifier that uniquely identifies the text, the identifier being at least one of randomly generated or at least partially representative of the entity;

assigning the identifier for the text, and storing the identifier in association with the text;

sending the identifier to the entity while restricting access to the text, the one or more words, and the audio signal with respect to the entity; and receiving, from the entity, the identifier and the first information, the first information being associated with the identifier; and one or more speakers to audibly output second information to the user, wherein the second information is at least partially based on the first information and the text.

2. The voice-controlled device as recited in claim 1, wherein the operations further comprise:

determining that the audio signal includes multiple audio signal segments each corresponding to respective portions of the text;

assigning a different identifier to each audio signal segment of the multiple audio signal segments;

determining that each different identifier is representative of at least a portion of the request;

storing the different identifiers in association with one another; and sending each of the different identifiers to the entity.

3. The voice-controlled device as recited in claim 1, wherein the operations further comprise:

determining, using the natural language processing service, that the text includes at least one word that is not representative of the request; and restricting access to the text with respect to the entity in response to determining that the text includes the at least one word.

4. The voice-controlled device as recited in claim 1, wherein the entity is associated with an application that resides on one or more of the voice-controlled device or a remote computing resource associated with the voice-controlled device, and wherein the operations further comprise:

receiving the identifier from the application, the identifier referencing the text and being used to incorporate the first information.

5. The voice-controlled device as recited in claim 1, wherein restricting access to the text, the request, the one or more words, and the audio signal with respect to the entity comprises withholding the text, the request, the one or more words, and the audio signal from the entity.

6. A method comprising:

identifying text represented in an audio signal generated from at least one microphone of a device, the text representing at least a portion of a user request;

generating an identifier that uniquely identifies the text, the identifier being at least one of randomly generated or at least partially representative of an entity that is to provide first information responsive to the user request;

sending the identifier to the entity while restricting access to the text and the audio signal with respect to the entity;

receiving the identifier and the first information from the entity, the first information being associated with the identifier; and causing second information to be output, wherein the second information is at least partially based on the first information and the text.

7. The method as recited in claim 6, wherein the first information received from the entity is additional text, and further comprising:

incorporating the text into the additional text; and causing the additional text to be output as sound.

8. The method as recited in claim 6, further comprising:

determining, using a natural language processing service, a likely meaning of the text; and determining, based at least partly on the likely meaning of the text, that the text is not to be sent to the entity.

9. The method as recited in claim 6, further comprising storing the text and the identifier in one or more of a datastore maintained by the device or a remote computing resource associated with the device.

10. The method as recited in claim 6, wherein the identifier is provided to the entity without providing access to the text or the audio signal.

11. The method as recited in claim 6, further comprising determining that the audio signal includes multiple audio signal segments, the determining including:

determining a start point of a first audio signal segment of the multiple audio signal segments that corresponds to a first detection of a first sound;

determining an end point of the first audio signal segment that corresponds to lack of sound for a predetermined amount of time;

determining a start point of a second audio signal segment of the multiple audio signal segments that corresponds to a second detection of a second sound; and determining an end point of the second audio signal segment that corresponds to lack of sound for the predetermined amount of time.

12. The method as recited in claim 11, further comprising:

assigning the identifier to the first audio signal segment;

determining a different identifier for the second audio signal segment; and storing the identifier in association with the different identifier.

13. The method as recited in claim 6, wherein the causing the second information to be output further comprises at least one of:

converting the second information into sound and causing the sound to be audibly output via one or more speakers of the device; or causing the second information to be visually output via a user interface of a user device associated with the user.

14. The method as recited in claim 6, further comprising:

determining, using a natural language processing service, that the text includes at least one word that is not representative of the user request; and restricting access to the text with respect to the entity in response to determining that the text includes the at least one word.

15. A method comprising:

determining that at least a portion of an audio signal generated is representative of a user request;

generating an identifier that uniquely identifies the audio signal, the identifier being at least one of randomly generated or at least partially representative of an entity that is to provide information responsive to the user request;

sending the identifier to the entity while restricting access to the audio signal and text represented in the audio signal with respect to the entity;
receiving the identifier from the entity;
identifying the information responsive to the user request based at least partly on the identifier; and
causing the information to be output.

16. The method as recited in claim 15, further comprising, at least partly prior to receiving the identifier from the entity, informing the entity of the user request.

17. The method as recited in claim 15, wherein the causing the information to be output further comprises causing the information to be audibly output via one or more speakers of the device, the information being representative of one or more words previously uttered by a user associated with the user request.

18. The method as recited in claim 15, further comprising storing the audio signal and the identifier in a datastore maintained by one or more of the device or a remote computing resource associated with the device, the datastore further storing related identifiers in association with one another.

19. The method as recited in claim 15, further comprising:
determining that the audio signal includes a first audio signal segment and a second audio signal segment;
assigning the identifier to the first audio signal segment and a different identifier to the second audio signal segment;
determining that the first audio signal segment and the second audio signal segment are related to one another; and
storing the identifier and the different identifier in association with one another.

20. The method as recited in claim 15, wherein the causing the information to be output further comprises causing the information to be visually output via a user interface of a user device associated with a user that provided the user request.

\* \* \* \* \*